United States Patent
Strozier

(10) Patent No.: US 9,482,572 B2
(45) Date of Patent: Nov. 1, 2016

(54) FOOT WARE AND PADS WITH VIBRATIONAL SENSING SYSTEMS AND METHODS FOR MAKING AND USING SAME

(71) Applicant: Scott A Strozier, Houston, TX (US)

(72) Inventor: Scott A Strozier, Houston, TX (US)

( * ) Notice: Subject to any disclaimer, the term of this patent is extended or adjusted under 35 U.S.C. 154(b) by 268 days.

(21) Appl. No.: 14/148,690

(22) Filed: Jan. 6, 2014

(65) Prior Publication Data
US 2014/0190266 A1 Jul. 10, 2014

Related U.S. Application Data

(60) Provisional application No. 61/749,356, filed on Jan. 6, 2013.

(51) Int. Cl.
*G01H 1/00* (2006.01)
*A43B 3/00* (2006.01)

(52) U.S. Cl.
CPC .............. *G01H 1/00* (2013.01); *A43B 3/0015* (2013.01); *A43B 3/0026* (2013.01)

(58) Field of Classification Search
CPC ........ G01H 1/00; G01H 3/00; A43B 3/0026; A43B 3/0015
See application file for complete search history.

(56) References Cited

U.S. PATENT DOCUMENTS

| | | | | |
|---|---|---|---|---|
| 4,569,352 A * | 2/1986 | Petrofsky | ........... | A61N 1/36003 607/49 |
| 5,181,504 A * | 1/1993 | Ono | ................... | A61H 23/0263 601/57 |
| 5,592,759 A * | 1/1997 | Cox | ..................... | A43B 1/0054 36/136 |
| 6,059,576 A * | 5/2000 | Brann | ................... | A61B 5/1116 340/686.1 |
| 8,253,586 B1 * | 8/2012 | Matak | ...................... | H04Q 9/00 340/870.07 |
| 8,308,665 B2 * | 11/2012 | Harry | .................. | A43B 3/0005 600/595 |
| 8,795,210 B2 * | 8/2014 | Talish | .................... | A61H 1/005 36/141 |
| 8,860,584 B1 * | 10/2014 | Matak | ................... | A61H 1/005 340/870.07 |
| 2004/0077975 A1 * | 4/2004 | Zimmerman | ......... | A61B 5/1116 600/595 |
| 2004/0173220 A1 * | 9/2004 | Harry | .................. | A43B 3/0005 128/892 |
| 2009/0233769 A1 * | 9/2009 | Pryor | .................... | B60K 35/00 482/8 |
| 2013/0072835 A1 * | 3/2013 | Harry | .................. | A43B 3/0005 601/46 |
| 2013/0234625 A1 * | 9/2013 | Kondo | ............... | H05B 37/0227 315/313 |

* cited by examiner

*Primary Examiner* — Laura Martin
*Assistant Examiner* — Samir M Shah
(74) *Attorney, Agent, or Firm* — Robert W. Strozier

(57) ABSTRACT

Vibration sensing wear for soldiers or law enforcement officers include at least one sensing system having vibration sensors, at least one processing unit, and a user interface unit capable of altering the wearer of surface vibration (e.g., ground, walls, floors, ceilings, etc.), object size, and direction.

20 Claims, 8 Drawing Sheets

FOOT WARE AND PADS WITH VIBRATIONAL SENSING SYSTEMS AND METHODS FOR MAKING AND USING SAME

RELATED APPLICATIONS

This application claims the benefit of and priority to U.S. Provisional Application Ser. No. 61/749,356 filed Jan. 6, 2013.

BACKGROUND OF THE INVENTION

1. Field of the Invention

Embodiments of this invention relate to vibration sensing wear for soldiers or law enforcement officers and methods for making and using same.

Embodiments of this invention relate to vibration sensing wear for soldiers or law enforcement officers, where the wear includes at least one sensing system having vibration sensors, at least one processing unit, and a user interface unit capable of alerting the wearer of air vibrations or surface vibrations (e.g., ground, walls, floors, ceilings, etc.) and vibration properties including frequency, amplitude, duration, direction, and/or other properties. Embodiment of the invention also relate to methods for making and using the wear. In certain embodiments, the sensing systems are associated with boots, knee pads, elbow pads, gloves, or other items of clothing worn by soldiers or law enforcement personnel. Embodiments of this invention also include systems and methods were multiple sensor outputs are used to enhance signal recognition and original directionality.

2. Description of the Related Art

In today's battlefield better technology may mean victory for a soldier before and after combat. However technology has to be fitted for the soldier. The best gear in the world is useless if it is too heavy for a soldier to carry. The best way to integrate new technology is to combine it with items the soldier cannot go without. Boots are one such necessity and one that may be fitted with a technology system to help protect soldiers.

Because boots are in contact with the ground, boots may make ideal sensors for detecting ground movement and battlefield combat operations.

Thus, there is a need in the art for items of wear that incorporate sensing or sensor systems to assist soldiers in assessing battlefield conditions and/or law enforcement personnel in assessing operational conditions.

SUMMARY OF THE INVENTION

Embodiments of the present provide vibration sensing systems for soldiers or law enforcement officers, where the vibration sensing systems may be associated with wear worn by soldiers and law enforcement personnel such as foot wear, knees pads, elbow pads, gloves, other similar wear, or mixtures or combinations thereof. The foot wear, knee pads, elbow pads, and/or gloves include a vibration sensing system of this invention designed to sense vibrations in a surface such as the ground, a wall, a floor, a ceiling, or other surface through which vibrations may be transmitted evidencing movement in the vicinity of the wearer. The sensing systems include at least one vibration sensor, at least one processing unit, and at least one user interface. The sensing systems produce sensor outputs, which are converted by the processing units into human cognizable outputs providing information on movement in the vicinity of the wearer to assist the wearer in assessing battlefield conditions, gathering information on potential approaching danger, and gathering information on asset deployment. The vibration sensors detect vibrations, phonon resonances, stresses, strains, or other waveforms traveling through solid objects such as the ground, walls, ceiling, floors, or other solid objects sensed by the sensors in the wear. The sensors detects these waveforms in the vicinity of the wearer in an active sensing zone or area around the wearer. The detected waveforms are then converted into output signals that are used by the processing units to determine information concerning objects that created the waveforms such as size, number, types, direction, weight, etc. The information is then communicated to the wearer via at least one user interface.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

The system would use piezoelectric sensors embedded on the bottom of the rubber soul. These sensors are sensitive to vibrations and can be used to feel the vibrations of the ground as the soldier walks. Sending the signal from the sensors through a processor to interpret the vibrations can warn the soldier of approaching enemies.

The overall base of the device is an ordinary combat boot that will be fitted with the necessary electronics that will enable it to detect ground movement. This includes piezoelectric sensors in the soles of the boots. These sensors pick up low vibrations in the ground whenever the soldiers boot comes into contact with the ground. The sensors collect this data and with a short range transmitter located in the back of the boot sends it to an interpreting device. The algorithm in the soldier's interpretation device will then be able to tell whatever is near to the soldier. The range of the boots reading will depend on the quality of the sensors and how well they hold up.

Figure 1A:
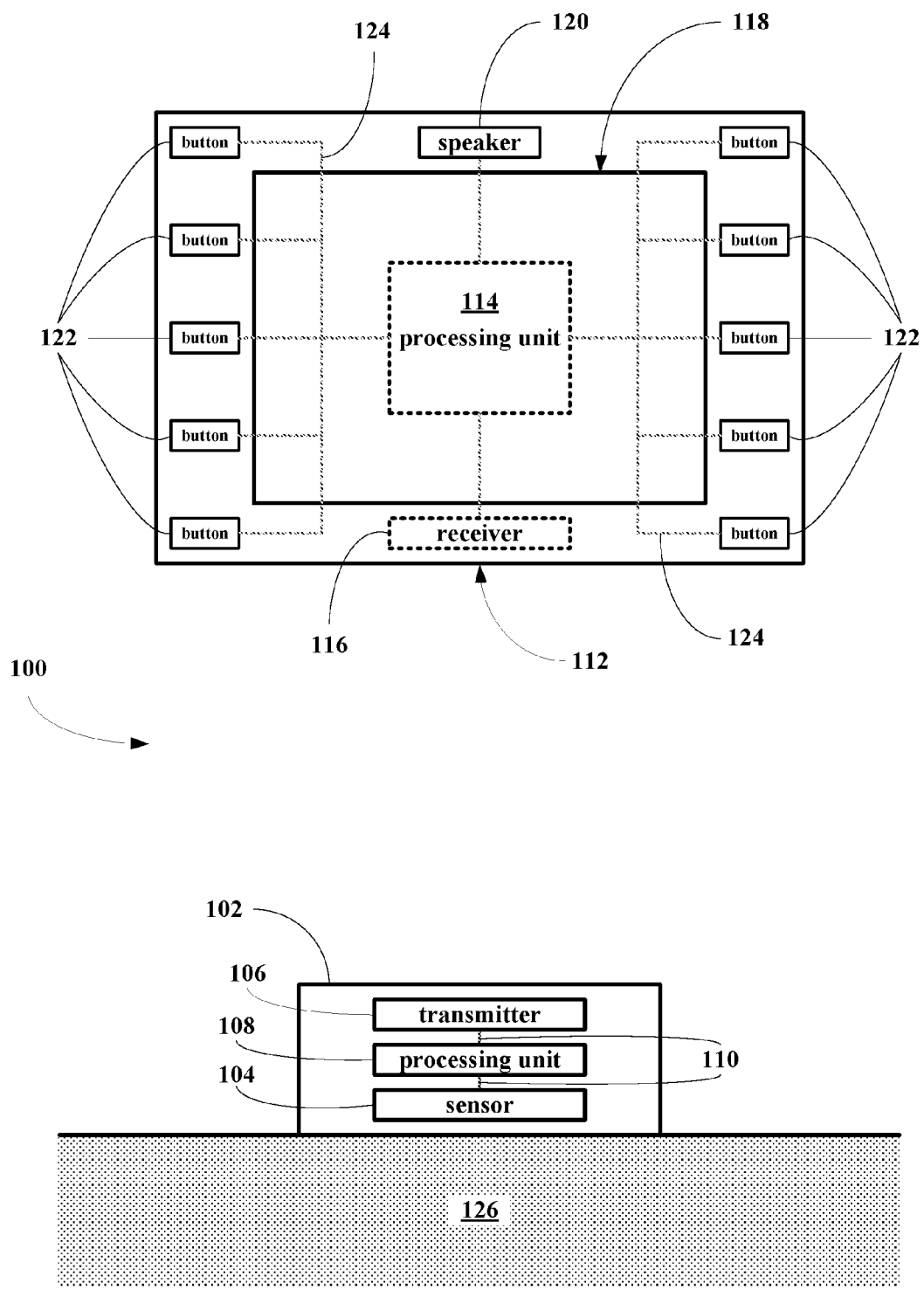
FIG. 1A depicts an embodiment of a generic wear apparatus including a sensing system of this invention.

Referring now to FIG. 1A, an embodiment of a wearable sensing system of this invention, generally 100, is shown to include a wearable body 102, such as a glove, an elbow pad, a knee pad, a boot, or other wearable item of clothing that may be placed in contact with the air, the ground, a wall, a ceiling or other surface through which vibrations may travel. The body 102 includes at least one piezoelectric sensor 104, at least one transmitter 106 and optionally at least one processing unit 108. The sensors 104, the transmitters 106 and the optional processing units 108 are connected via communication channels 110, which may be via wires or wireless channels. The sensors 104 and the transmitters 106 maybe of a unitary construction, which may also include the optional processing units 108. Optionally, the body 102 may include other sensors such as strain gauges, temperature sensors, humidity sensors, pressure sensors, phonon resonance sensors, or the like. The sensing system 100 also may include at least one user interface 112. The user interfaces 112 may be visual, audio, or audio visual. In this figure, the embodiment of the at least one user interface 112 comprises an audio visual interface. In this embodiment, the at least one user interface 112 includes a processing unit 114, a receiver 116, a display 118, an optional speaker 120, and optional control buttons 122. The components are connected to the processing unit 114 via wires 124. In the figure, the body 102 is shown in contact with a surface 126 through which vibrations propagate and are capable of being sensed by the sensor 104. Of course, it should be recognized that all of the sensors 104 are equally capable of sensing vibrations propagating through the air and therefore, the sensors 104 may be used to detect sonic booms, explosions, and other sonic vibrations of sufficient intensity transmitting through the air.

Figure 1B:
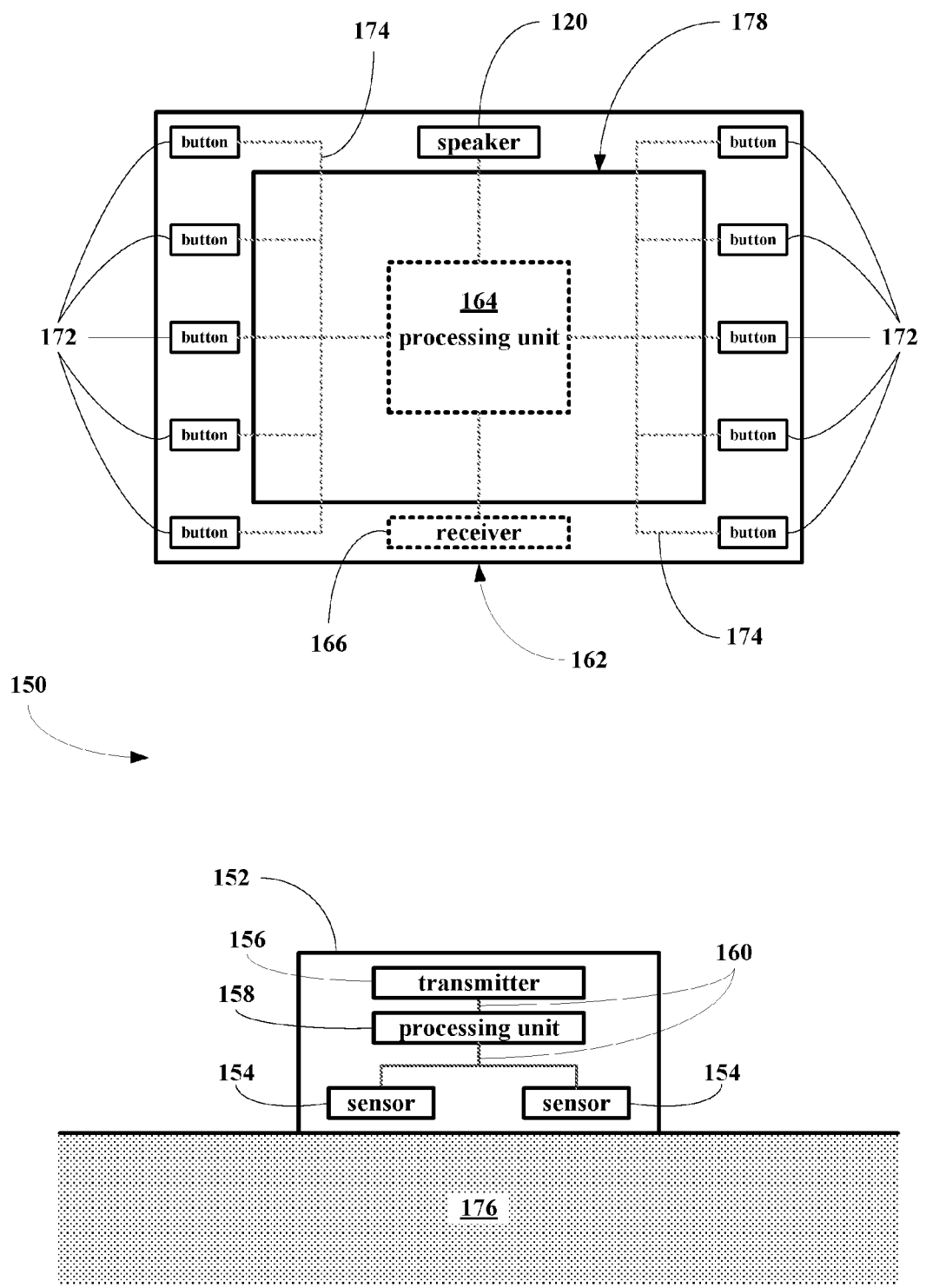
FIG. 1B depicts an embodiment of a generic wear apparatus including a sensing system of this invention.

Referring now to FIG. 1B, another embodiment of a wearable sensing system of this invention, generally 150, is shown to include a wearable body 152, such as a glove, a elbow pad, a knee pad, a boot, or other wearable item of clothing that may be placed in contact with the air, ground, a wall, a ceiling or other surface through which vibrations may travel. The body 152 includes piezoelectric sensors 154, a transmitter 156, and optionally a processing unit 158. The sensor 154, the transmitter 156, and the optional processing unit 158 are connected via communication channels 160, which may be via wires or wireless channels. Optionally, the body may include other sensors such as strain gauges, temperature sensors, humidity sensors, pressure sensors, phonon resonance sensors, or the like. The wear system 100 also includes a user interface 162. The user interface 162 may be visual, audio, or audio visual. In this figure, the embodiment of the user interface 162 comprises an audio visual interface. The interface 162 includes a processing unit 164, a receiver 166, a display 168, an optional speaker 170, and optional control buttons 172. The components are connected to the processing unit 164 via wires 174. In the figure, the body 152 is shown in contact with a surface 176 through which vibrations propagate and are capable of being sensed by the sensor 154.

Figure 2:
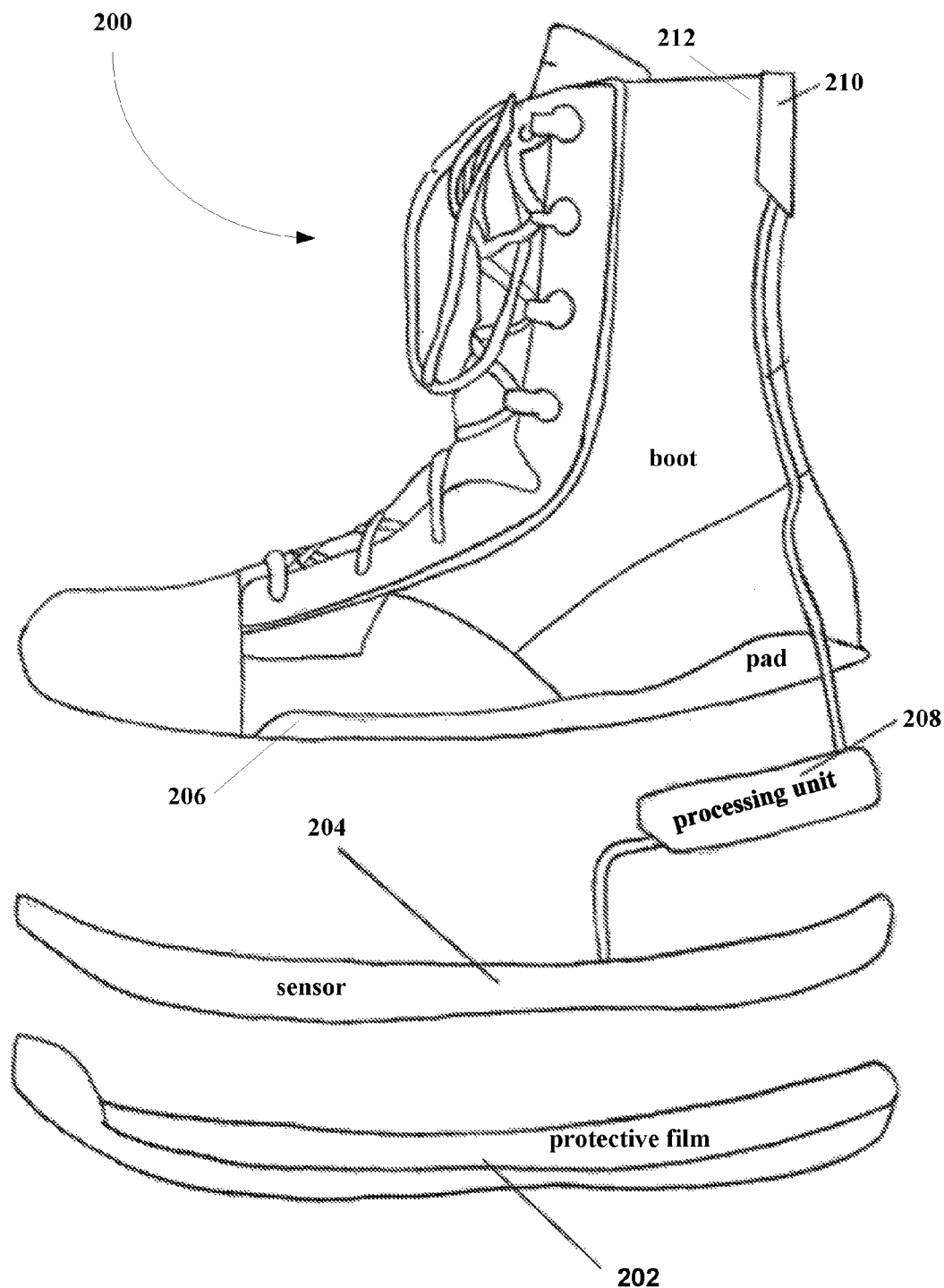
FIG. 2 depicts an embodiment of a foot wear apparatus including a sensing system of this invention.

Referring now to FIG. 2, an embodiment of a boot of this invention, generally 200, is shown. The boot 200 includes a protective film 202 over the rubber soul of the boot. This can be a thin plastic coating added to the sensors in order to protect them from excessive damage without impeding their operation. The next change is to rubber soul of the boot which will be embedded with the piezoelectric sensors 204 in order to detect ground vibrations. The piezoelectric sensors 204 are controlled by small pressure pads 206 above the rubber soul of the boot. This will ensure that the sensors only record the vibrations on the ground when the soldiers boot actually comes into contact with it. Next, the information from the sensors is gathered by a processing unit or processor 208 in the heel of the boot. The processor is connected to a short range transmitter 210 located on the rear "Tug" 212 of the boot.

The transmitter 210 sends the data to a predetermined phone or communication device or user interface unique to each individual soldier. The device will take the data and run it through a program that will interpret the vibration data collected by the piezoelectric sensors 204. This program will then alert the soldier to any dangers as prewritten in the program of the interpretation algorithm.

Figure 3:
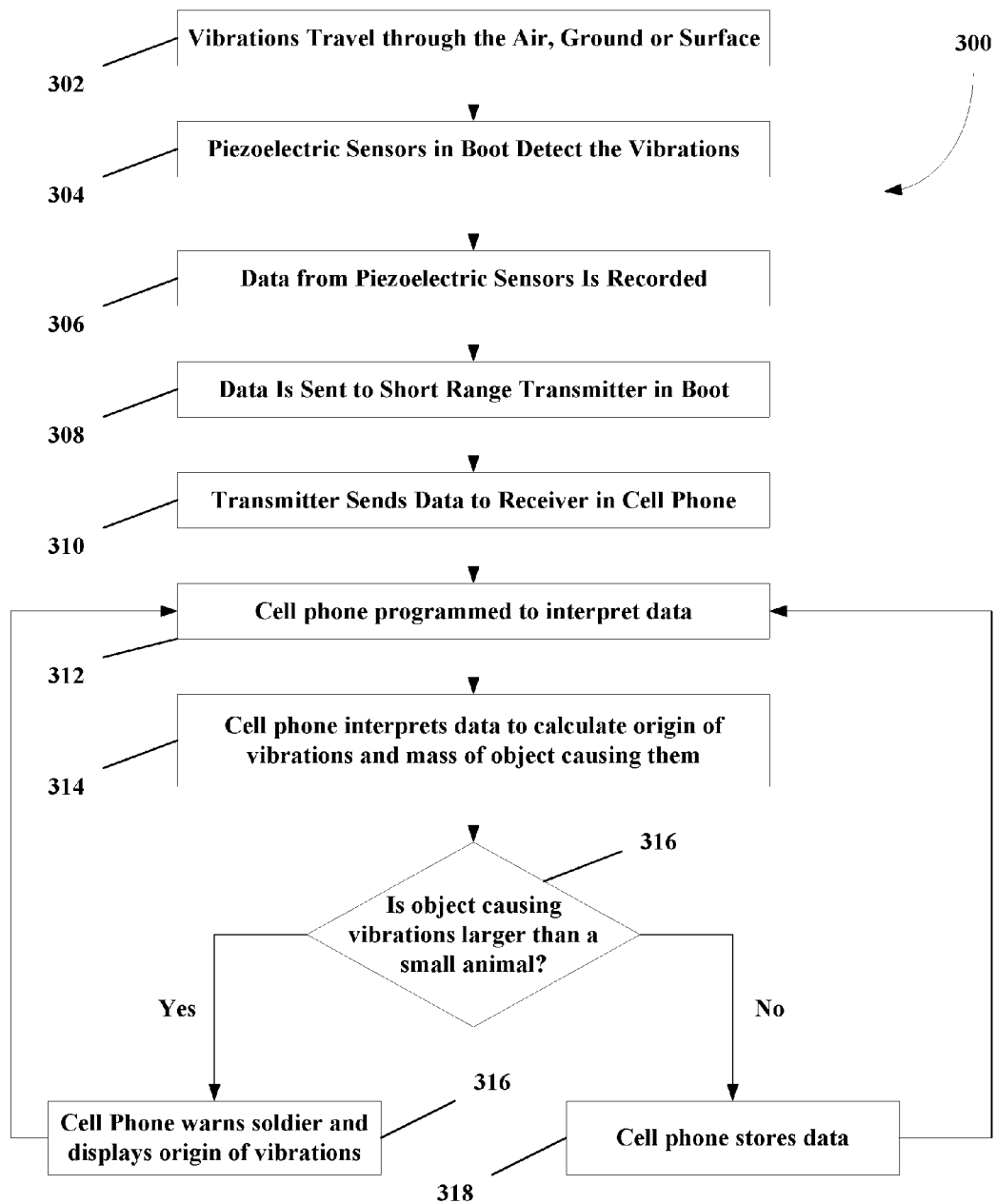
FIG. 3 depicts an embodiment of a generic method for implementing a sensing system of this invention.

Referring now to FIG. 3, the process, generally 300, that the apparatus will undertake in order to identify potential threats to soldiers. The process begins when vibrations travel through the air or a surface such as the ground in contact with a wear system of this invention in a vibration step 302. When this occurs, the vibrations will be picked up by the piezoelectric sensors in the sole of the boot in a sensing step 304. The sensors gather the data and record the data in a data acquisition step 306, where it can then be put to use.

The data is sent to the short range transmitter located on the back of the soldiers boot in a send step 308. The transmitter will then send the recorded data to a receiver in a cell phone or other data computing device in a transmit step 310. The data that has been received will then be interpreted by the device. In interpreting the data, the computing device will calculate the size of the object that created the vibrations and give an estimate of the location and direction of the object generating the vibrations in an interpretation step 312.

Next is the only decision the program needs to make, whether the vibrations picked up by the device demand the attention of the soldier by determining how large the object is in a calculate step 314. The data is then analyzed in a decision step 316. If the answer is "yes" then the device will warn the soldier of the large vibrations and then display their estimated location, where it will then continue to record and interpret data from the sensors in a warn step 318. If the answer is "no", the device will simply store the data in a store step 320. The two branches then direct back to the interpretation step 312 continuing to interpret incoming data.

Figure 4A:
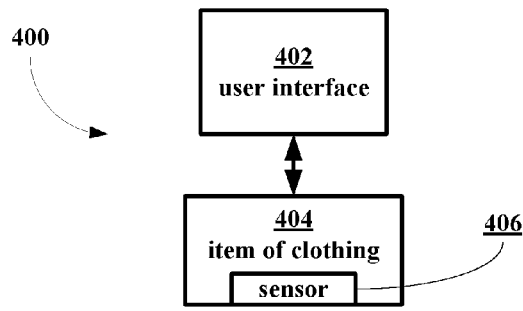
FIGS. 4A-C depict embodiments of systems of this invention.
Figure 4B:
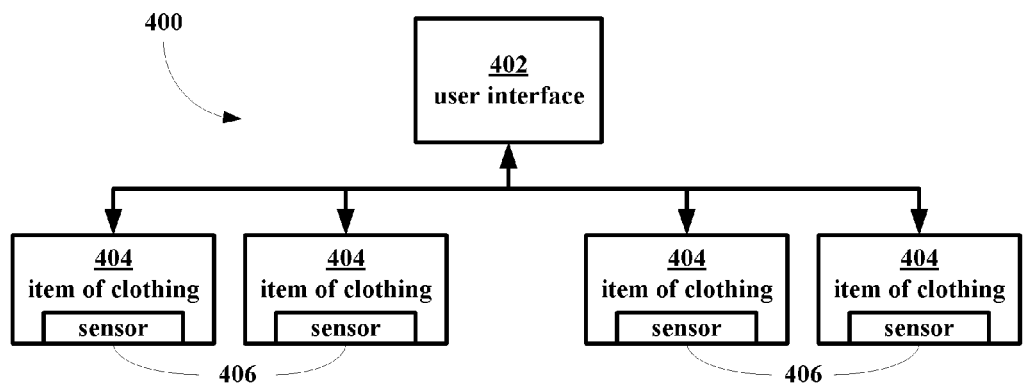
Figure 4C:
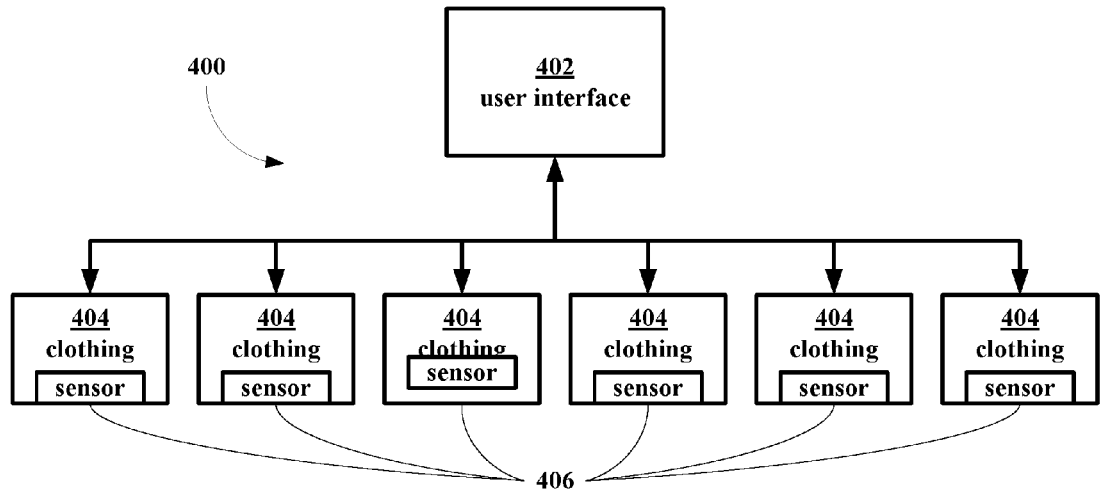

Referring now to FIG. 4A, a system of the present invention, generally 400, including a user interface 402 associated with a single user and in two way communication with an item of clothing 404 including a sensor system 406 of this invention worn by a single person. Referring now to FIG. 4B, another system of the present invention, generally 400, including a user interface 402 associated with a single user and in two way communication with four items of clothing 404, each including a sensor system 406 of this invention worn by a single person. Referring now to FIG. 4C, another system of the present invention, generally 400, including a user interface 402 associated with and in two way communication with six items of clothing 404, each including a sensor system 406 of this invention worn by six different persons. The systems of FIGS. 2B&C, include data from multiple sensors which improve data acquisition for determining the nature of the vibration and direction from which the vibration originated.

Figure 5:
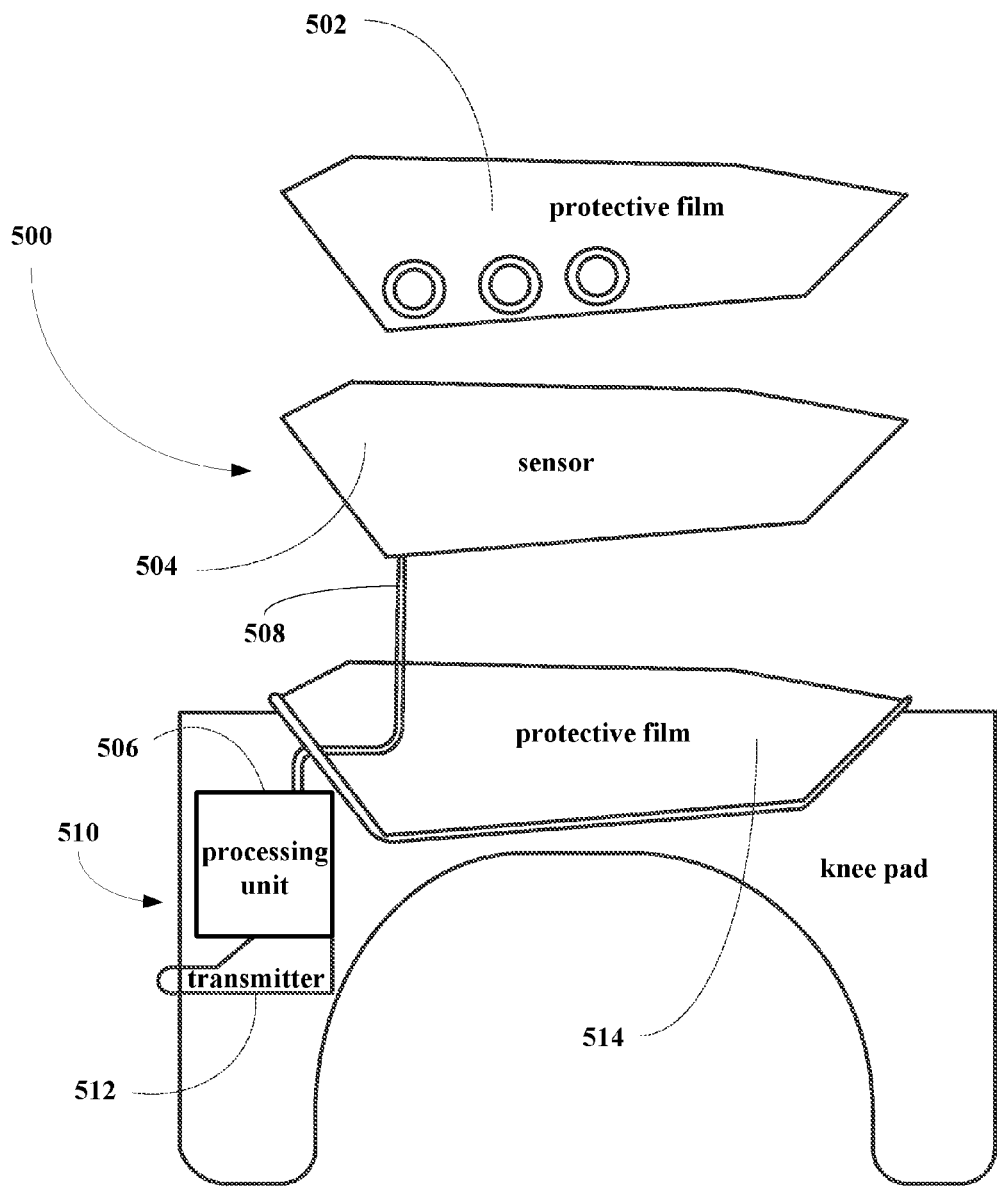
FIG. 5 depicts an embodiment of an elbow pad apparatus of this invention.

Referring now to FIG. 5, an embodiment of a boot of this invention, generally 500, is shown. The knee pad 500 includes a protective film 502 covering a piezoelectric sensor 504 in order to detect vibrations. The piezoelectric sensor 504 is connected to a processing unit 506 via a wire 508 in side part 510 of the pad 500. The processor 506 is connected to or includes a short range transmitter 512. The piezoelectric sensor 504 and the cover 502 fit into a knee protective layer 514.

The transmitter 512 sends the data to a predetermined phone or communication device or user interface unique to each individual soldier or to a command center. The phone, device or command center analyzes the data using appropriate software programs interpreting the vibration data collected by the piezoelectric sensors 204 to determine type, distance and direction of the vibration. This program will then alert the soldier or command center to any dangers.

Figure 6:
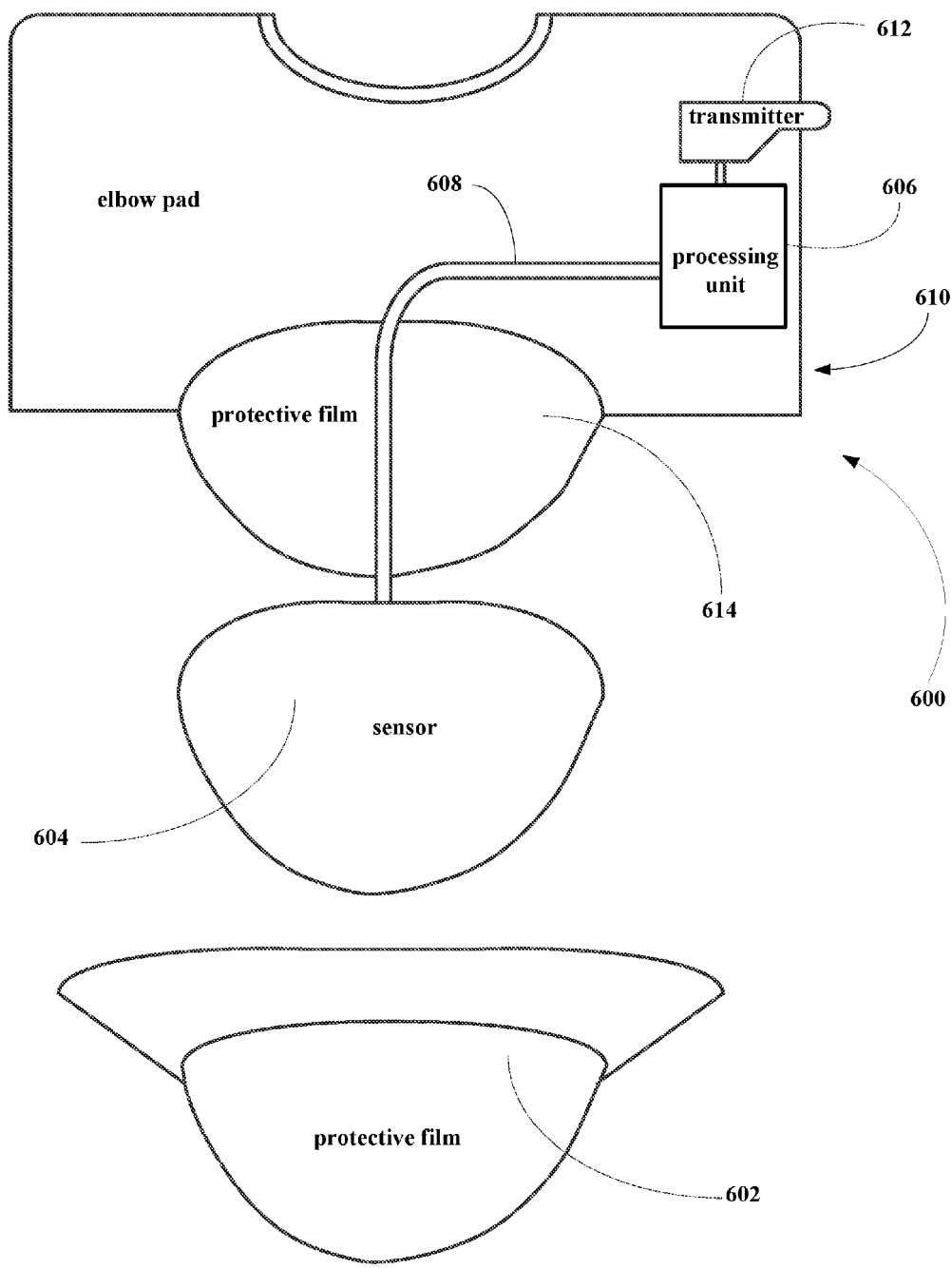
FIG. 6 depicts an embodiment of a knee pad apparatus of this invention.

Referring now to FIG. 6, an embodiment of an elbow pad of this invention, generally 600, is shown. The pad 200 includes a protective film 602 covering a piezoelectric sensor 604 in order to detect vibrations. The piezoelectric sensor 604 is connected to a processing unit 606 via a wire 608 in side part 610 of the pad 600. The processor 606 is connected to or includes a short range transmitter 612. The piezoelectric sensor 604 and the cover 602 fit into an elbow protective layer 614.

Figure 7:
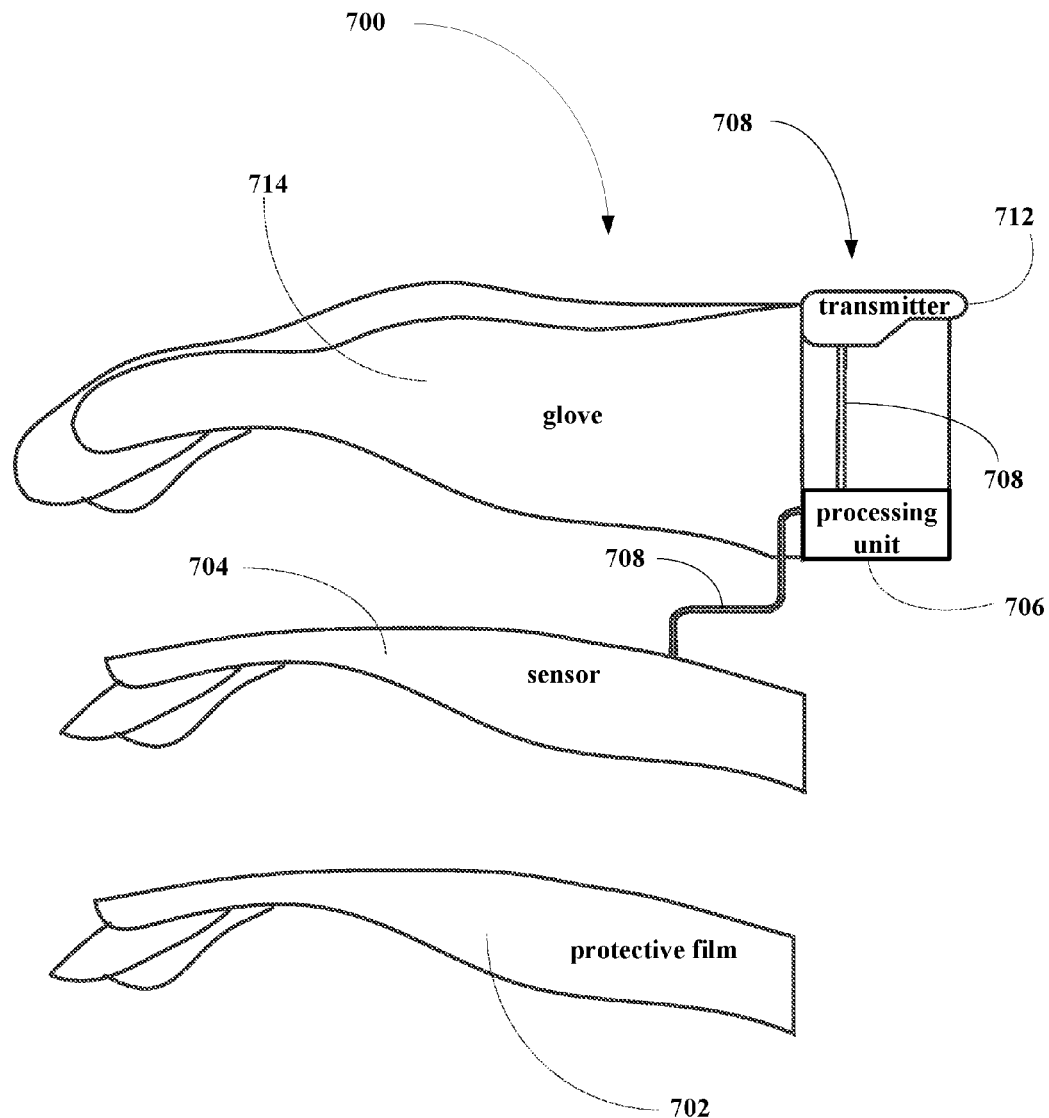
FIG. 7 depicts an embodiment of a glove apparatus of this invention.

Referring now to FIG. 7, an embodiment of a glove of this invention, generally 700, is shown. The glove 700 includes a protective film 702 covering a piezoelectric sensor 704 in order to detect vibrations. The piezoelectric sensor 704 is connected to a processing unit 706 via a wire 708 in top part 710 of the pad 700. The processor 706 is connected to via a wire 708 or includes a short range transmitter 712. The piezoelectric sensor 704 and the cover 702 fit into an elbow protective layer 714.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

I claim:

1. A wearable apparatus comprising:
   a vibration sensing system including at least one vibration sensor, where the at least one sensor senses vibrations propagating through the air or through a surface into the apparatus and generates an output signal,
   a processing unit in communication with the sensing system, where the processing unit receives and analyzes the output signal to produce vibration data including vibration properties comprising frequency, amplitude, duration, and/or direction, and determines information concerning an object or objects generating the vibration data, and
   a user interface including a human cognizable output device in communication with the processing unit, where the user interface: (a) receives the vibration data and the information concerning the object or objects generating the vibration data and (b) produces a human cognizable output for a wearer and/or a command center.

2. The apparatus of claim 1, wherein the at least one vibration sensor comprises a piezoelectric transducer.

3. The apparatus of claim 1, wherein the wearable apparatus comprises at least one of foot wear, a knee pad, an elbow pad or gloves.

4. The apparatus of claim 1, wherein the surface is at least one of the ground, a wall, a floor or a ceiling through which vibrations may be transmitted into the apparatus evidencing movement of potential threats in the vicinity of the wearer.

5. The apparatus of claim 1, wherein the human cognizable output device produces human cognizable outputs providing information on movement in the vicinity of the wearer to assist the wearer in assessing battlefield conditions, gathering information on potential approaching danger, and gathering information on asset deployment.

6. The apparatus of claim 1, wherein the sensing system detects vibrations, phonon resonances, stresses or strains traveling through at least one of the ground, walls, ceiling or floors.

7. The apparatus of claim 1, wherein the sensing system detects waveforms in a vicinity of the wearer in an active sensing zone of the apparatus corresponding to an area around the wearer.

8. The apparatus of claim 1, wherein the information comprises size, number, type, direction, and/or weight of the object or the objects generating the vibration data.

9. A wearable apparatus comprising:
   a body including:
      a vibration sensing system including at least one vibration sensor, where the at least one sensor: (a) senses vibrations propagating through the air or through a surface and into the apparatus and (b) generates an output signal,
      a processing unit in communication with the sensing system, where the processing unit: (a) receives and analyzes the output signal to produce vibration data including vibration properties comprising frequency, amplitude, duration, and/or direction, and (b) determines information concerning an object or objects generating the vibration data, and
      a user interface including a human cognizable output device in communication with the processing unit, where the user interface: (a) receives the vibration data and the information concerning the object or objects generating the vibration data and (b) produces a human cognizable output for a wearer and/or a command center.

10. The apparatus of claim 9, wherein the vibration sensor comprises a piezoelectric transducer.

11. The apparatus of claim 9, wherein, the body comprises at least one of footwear, a knee pad, an elbow pad or gloves.

12. The apparatus of claim 11, wherein the footwear comprises a boot.

13. The apparatus of claim 9, wherein the surface is at least one of the ground, a wall, a floor or a ceiling through which vibrations may be transmitted evidencing movement in the vicinity of the wearer.

14. The apparatus of claim 9, wherein the sensing system produces sensor outputs, which are converted by the processing units into human cognizable outputs providing information on movement in the vicinity of the wearer to assist the wearer in assessing battlefield conditions, gathering information on potential approaching danger, and gathering information on asset deployment.

15. The apparatus of claim 9, wherein the body further includes:
   a strain gauge, a temperature sensor, a humidity sensor, a pressure sensor, or a phonon resonance sensor, where the sensor senses phonon resonances, stresses, strains, temperature, pressure or humidity.

16. The apparatus of claim 15, wherein the sensor detects waveforms in a vicinity of the wearer in an active sensing zone or area around the wearer and generates a waveform output signal.

17. The apparatus of claim 16, wherein the processing unit converts the waveform output signal into information concerning objects including size, number, types, direction, and weight.

18. The apparatus of claim 9, wherein the body further includes the processing unit.

19. The apparatus of claim 9, wherein the sensing system detects vibrations, phonon resonances, stresses or strains traveling through at least one of the ground, walls, ceiling or floors.

20. The apparatus of claim 9, wherein the information comprises size, number, type, direction, and/or weight of the object or the objects generating the vibration data.

* * * * *